Jan. 11, 1966 D. L. RICHTER 3,229,038

SOUND SIGNAL TRANSFORMING SYSTEM

Filed Oct. 31, 1961 2 Sheets-Sheet 1

INVENTOR.
DONALD L. RICHTER
BY Eugene M. Whitacre
Attorney

Jan. 11, 1966 D. L. RICHTER 3,229,038

SOUND SIGNAL TRANSFORMING SYSTEM

Filed Oct. 31, 1961 2 Sheets-Sheet 2

INVENTOR.
DONALD L. RICHTER

BY Eugene M. Whitacre

Attorney

United States Patent Office 3,229,038

Patented Jan. 11, 1966

3,229,038

SOUND SIGNAL TRANSFORMING SYSTEM

Donald L. Richter, Bellmore, N.Y., assignor to Radio Corporation of America, a corporation of Delaware Filed Oct. 31, 1961, Ser. No. 149,027
7 Claims. (Cl. 179—1)

Figure 1:
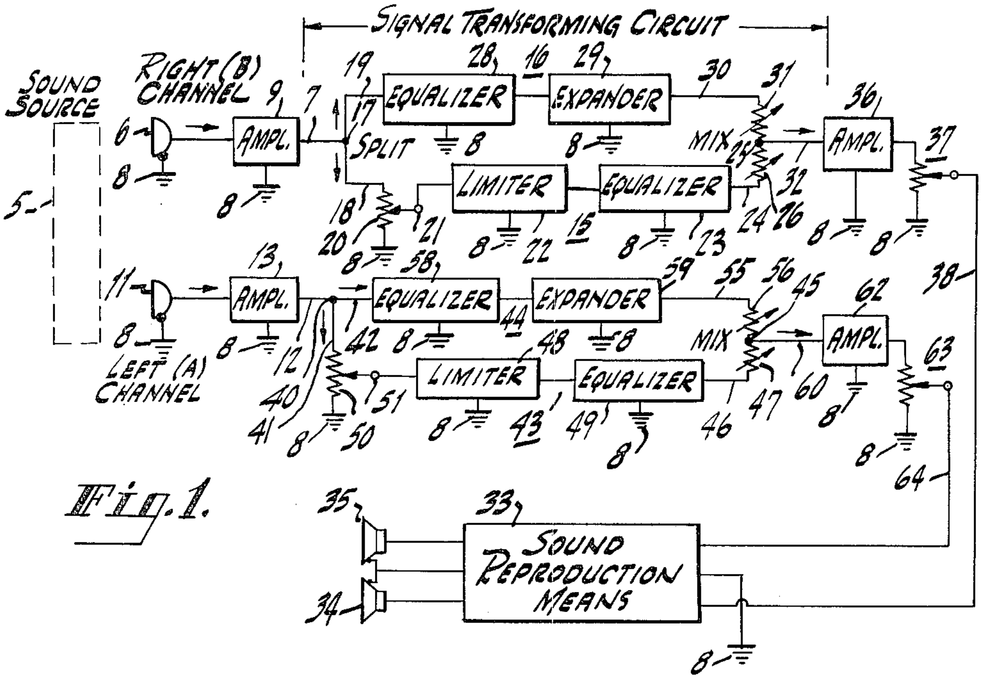

The present invention relates to audio-frequency or sound signal recording and reproducing systems, and more particularly to sound signal translating systems wherein high level sounds may be translated and reproduced at relatively low levels and yet maintain the same illusion of perspective and tonal balance as the original sound.

Fletcher-Munson curves show that the loudness, or hearing sensation, of any sound varies with the frequency as well as the intensity or loudness level variation. These curves do not have the same slope and therefore all signals, at all loudness levels, do not affect the hearing in the same proportion of energy at the various frequencies in the audio-frequency range.

Thus it is known that in the reproduction of sound signals, the loudness or intensity characteristic of the auditory sensation in the reproduction should be essentially the same as resulted or would result from the original sounds as actually produced. It is also known that if this relation is not maintained there will be an undesirable discrepancy in loudness or listener sensation between the original production at one loudness level and the later reproduction of the sound signals at a different and generally lower level, due to the above noted ear or hearing sensitivity to sound signal frequencies as a function of loudness. In other words, in a linear signal translating and reproducing system, sound reproduced at a loudness level other than that at which it was produced will be subject to the dynamic distortion introduced by the hearing of the average listener.

Therefore, it is an object of this invention to provide an improved signal translating system for the correction of errors of this type in recording or producing sound, particularly at relatively high levels for later reproduction at generally lower and different levels.

For further consideration of the present sound signal translating system it should be understood that "loudness" as used herein and generally accepted, is a psychological property of sound, characterized by strength or weakness, and varies with the physical intensity of the sound as well as its frequency. Thus sounds of very-low and very-high frequency require much more intensity than those in the middle audio-frequency range, in order to be perceived as equally loud. "Sound intensity" or "loudness level," on the other hand, may be conidered to be the rate of flow of sound energy or the average rate at which sound energy is transmitted per unit of time through a unit area, generally measured in watts per square centimeter. Thus sound intensity or loudness level may be equal or the same over a large range of frequencies but with a different loudness, or sensation on the human hearing, at different frequencies.

In the recording and reproduction of sound, it is desirable, therefore, to transform original high-intensity audio-frequency or sound signals, as derived from a large orchestra for example, into corresponding audio-frequency signals that will give the same impression as the original sound when reproduced and auditioned at a suitably lower sound intensity or loudness level. Fletcher-Munson loudness curves of the type referred to and other curves showing the relation between loudness sensation and actual intensity are shown for example in RCA Radiotron Designers Handbook, Fourth Edition 1952, under Section 5—Loudness, on pages 826–7. Data represented by these curves may be combined to provide a composite set of working curves indicating that both frequency and dynamic compensation is required to reproduce an original-loud accurately-balanced sound to the same accurately balanced sound at a lower volume or loudness level.

It is therefore a further object of this invention to provide an improved sound signal translating system for transforming an original high-intensity sound signal into a corrected sound signal that will give the same impression on an average listener of frequency and dynamic range, or illusion of perspective and tonal balance, as the original sound, when reproduced and auditioned at a lower intensity level. This transformation or translation can be from microphone means directly through radio, television or public address systems and the like, involving direct production and reproduction, or through recordings, such as records or tapes, for indirect reproduction. It may here be noted that the recording of music is generally at a higher intensity level than the reproduction.

It is also a further object of this invention, therefore, to provide an improved sound signal translating system having at least one signal transforming circuit for equalizing and dynamically-controlling translated sound signals, and more faithfully reproducing sound therefrom at a different intensity or loudness level than that at which the sound is or was produced, and one which provides effective compensation or correction in sound signal translation from a higher original loudness level or intensity to a lower loudness level or intensity for sound reproduction, whereby discrepancies in the hearing sensitivity to tone or sound frequencies as a function of loudness are compensated. Thus in one of its aspects, the signal translating system of the present invention may be considered as intensity or decibel transformer means constructed and operable to correctly proportion loudness variations at a lower intensity level of reproduction to equal original loudness variations in effect.

Thus the signal translating and transforming system of the present invention includes means for altering the dynamics and equalization of sound or audio-frequency signals, derived directly or reproduced from original and generally high-intensity sound program and like material, to provide corresponding signals for recording and/or reproduction at lower intensity levels with substantially the same effect on a listener as the original sound. As a basis for this, new equal-loudness-level contour curves of the Fletcher-Munson type are developed from the original and the loudness curves above referred to.

Further in accordance with the invention, in this system a sound signal transforming circuit comprising two branches or legs, is provided in each signal translating channel, of which there are at least two in a stereophonic sound signal translating system. The applied signal in each channel is divided or split and the two signal components or portions, after being translated through the two branches or legs, are again combined or mixed and applied to an output single channel circuit.

One branch or leg of the sound signal transforming circuit of each channel comprises a signal amplitude limiter or compresser means and also signal frequency equalizer means, the limiter means providing a high degree of limiting at high intensity levels. Bass or low-frequency compensation is added to the limited signal by the equalizer means which follows the limiter means in the channel branch. The maximum signal achieved by this combination may be adjusted by branch output mixer means to provide a peak somewhat less than that for the total desired signal.

The other leg or branch of the sound signal transforming circuit, above referred to, is unlimited and may include expander means in combination with associated equalizer means which normally provides a boost or increase in the mid-range or high-frequency response in signals translated through this branch. The signal is then carried through branch output mixer means, to unite with the other component or portion of the signal, and provides the proper dynamics and equalization for the loud or high-level portion of the total signal. The ratio between the low-level or limited portion and the high-level or unlimited portion of the split or divided input signal, for correct balance and desired dynamic range, is provided through the mixing means network. The limited portion of the signal and the unlimited or expanded portion of the signal are mixed together in a ratio to give the desired dynamic range, and compensation or equalization in the two branches or legs is added to shape the response curves for the desired combined output signal.

The system of the present invention is particularly adapted for translating and transforming audio-frequency signals from a sound source to a recording medium, such as a disc or tape, compensated for effective reproduction at lower loudness or sound intensity levels than the original sound and with the same effective tonal perspective and balance. It is equally effective in the transmission of live program material for broadcasting, and for incorporation in sound reproducing systems such as phonographs, radio and television receivers, and the like.

The invention will, however, be further understood from the following description when considered with reference to the accompanying drawings, and its scope is pointed out in the appended claims.

Figure 2:
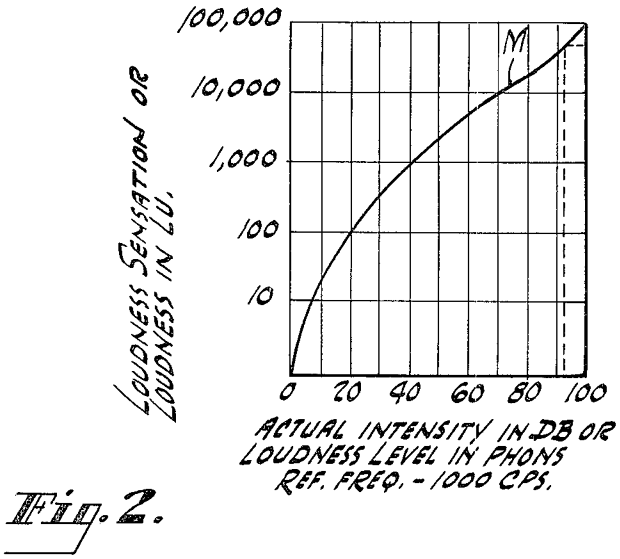
Figure 4:
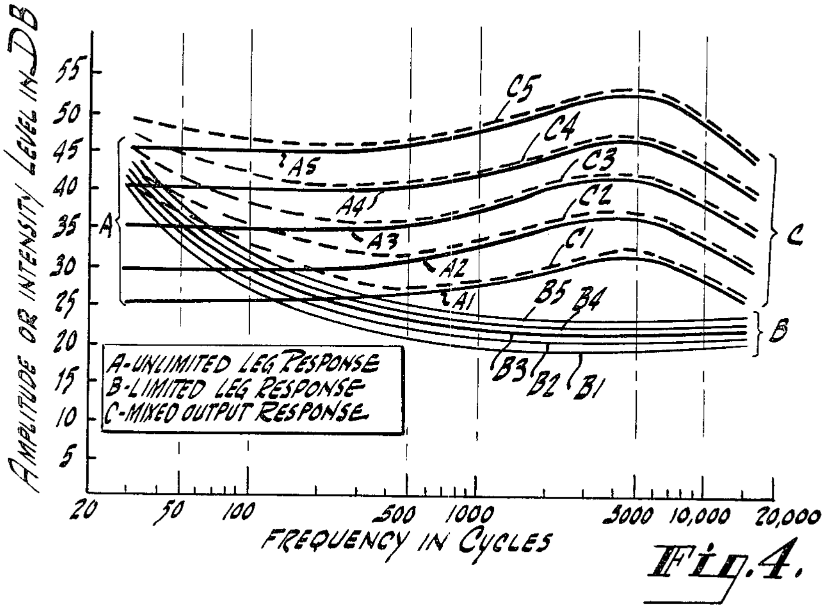
Figure 3:
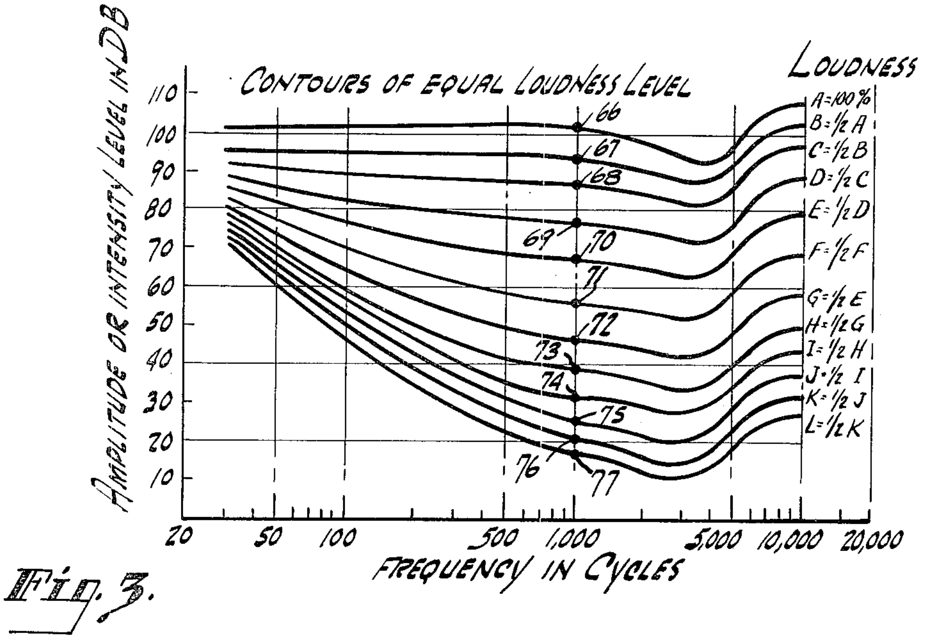

In the drawings, FIGURE 1 is a schematic circuit diagram of a signal translating system of the dual-channel stereophonic type embodying the invention, and FIGURES 2, 3 and 4 are graphs showing curves illustrating certain frequency-response characteristics concerned with the operation of the system of FIGURE 1.

Referring to FIGURE 1, original sound or program material from a relatively high-amplitude source such as an orchestra, indicated by the rectangular outline 5, is picked up by suitable means such as a microphone 6 connected with a signal translating channel having an input circuit represented by a signal conductor 7 and common or system ground 8, the conductor 7 being the high signal-potential side of the circuit and of signal translating channel. A suitable audio-frequency amplifier 9 may be connected between the microphone 6 and the circuit conductor 7, with a connection to ground as indicated, whereby signals picked up by the microphone are suitably amplified and applied to input circuit. This signal translating or amplifying channel may be connected with any other suitable source of audio-frequency signals representing sound pickup from a relatively high intensity source.

In the present example a dual-channel signal translating system is shown for stereophonic sound pickup and reproduction from the sound source 5. The second channel includes a second microphone 11 placed in spaced stereophonic relation to the first microphone in front of the sound source 5 as one of a stereophonically related pair of pickup devices. With this arrangement, the microphone 6 and its connected signal translating channel may be considered to be the right or (B) channel while the microphone 11 provides the input device for the left or (A) signal translating channel. The latter includes a channel input circuit having a conductor 12 connected with the microphone 11 through a second audio-frequency amplifier 13.

Referring to the right channel, the input circuit conductor 7 is connected with a split or divided signal transforming circuit having a limited or low-level branch 15 and an unlimited or high-level branch 16. These are both connected with the input conductor 7 at a dividing terminal 17 through branch circuit conductors 18 and 19 respectively. Both branches are connected with system ground 8, and the branch conductor 18 of the limited channel includes suitable volume or gain control means, such as a variable potentiometer 20 connected to ground 8 and having a movable output contact 21. The contact 21 is connected through a limiter circuit or means 22 and a series-connected following equalizer circuit or means 23 to a branch output conductor 24. The latter is connected to an output mixing terminal 25 through a variable gain-control element indicated as a series variable resistor 26, by way of example.

In a similar manner the unlimited branch 16 is completed from the input circuit conductor 19 through equalizer means or circuit 28 and series-connected expander means 29 to a channel output conductor 30. The latter in turn is connected to the common output mixing terminal 25 through a series variable resistor 31 representing any suitable variable gain-control element like the element 26, for controlling the output signal amplitude from the branch 16. Both devices 26 and 31, in conjunction with the common terminal 25 thus provide variable mixing means for recombining the split or divided branch signal components or portions for application to a common channel output circuit connected with said terminal and represented by a common output conductor 32 and system ground 8.

As indicated by the legend, between the input circuit 7–8 and the output circuit 32–8 is a signal transforming circuit in the right signal translating channel, comprising the branch or leg 15 with series-connected limiter and equalizer elements, and the parallel branch 16 comprising series-connected equalizer and expander elements. Through these elements and the split or divided circuit the applied signal from any suitable source, such as that shown, is split or divided at the branch terminal 17 and translated and processed, as will be described hereinafter, in the separate branches from which it is mixed at the terminal 25 for further utilization at a different signal level from that derived from the sound source. In any case the signal is utilized either directly or indirectly in the reproduction of the derived sound through sound reproduction or utilization means 33 having sound-translating or loudspeaker elements 34 and 35 for example. The reproduction or utilization means is connected to system ground 8 and to the output conductor 32 through suitable translating means such as audio-frequency amplifier means 36, channel output gain-control means 37, and connecting circuit conductor 38 and system ground 8.

Thus in some embodiments, the sound reproduction or utilization means 33 may be considered to include sound recording means from which is derived the recorded material for eventual sound reproduction through loudspeaker means referred to, with suitable amplifying and driving equipment therefor included, as required. This represents any suitable utilization means for the translated and transformed signals, and may provide for the recording and/or reproduction of these signals directly or indirectly.

In a similar manner the left channel includes a dividing terminal 40 which is connected through branch conductors 41 and 42 with respective limited and unlimited branch circuits 43 and 44 respectively which, after splitting or dividing at the terminal 40, are reunited or mixed at an output terminal 45. An output conductor 46 for the branch 43 is connected to the terminal 45 through a variable mixing or control element 47 and, in the same manner as the corresponding right-channel branch circuit 15, this branch is provided with series-connected elements comprising limiter means 48 and equalizer means 49, and is provided with similar input gain-control means 50–51 as indicated. All circuits of this branch are likewise returned to common or system ground 8 as the low potential side of the channel and system.

The unlimited branch 44 of the left (A) signal translating channel is the same as the branch 16 of the right (B) channel and includes an output conductor 55 connected to the common output terminal 45 through a variable mixing or control element 56, for signal mixing in conjunction with the element 47, as described for the corresponding right channel circuits. Between the input conductor 42 and the output conductor 55 for the branch 44, are serially connected an equalizer 58 and an expander 59 in the same manner as for the corresponding branch of the right channel.

The left (A) channel is provided with a common output circuit, represented by system ground and an output conductor 60 connected with the terminal 45, and the output signal from this circuit is applied to the sound reproduction or utilization means 33 through suitable translating means such as audio-frequency amplifier means 62, channel output gain-control means 63, and a connection lead 64.

Since both signal translating (A) and (B) channels of the stereo system, shown by way of example, are identical and either may be used independently in single channel applications, the following consideration of the operation of one channel will apply to both as is understood. Referring now to the right (B) channel, for example, sound signals of relatively high intensity picked up by the microphone 6 are applied through the amplifier 9 to the channel input circuit 7–8 and are divided or split at the terminal 17 to flow therefrom through the two branches or legs 15 and 16, and thence through the variable mixing circuits to the terminal 25 and the output circuit 32–8. The relative amounts of the signal portion from each branch is controlled by the mixing elements 26 and 31, and the relative amount of signal applied to the limited branch 15 with respect to the unlimited branch 16 is controlled by the input gain control device 20–21. In the low-level limited leg 15, a high degree of limiting at all intensity levels is provided by the limiter means 22. Bass or low-frequency components are usually added to this limited signal by the equalizer means 23. Normally the maximum signal achieved by this combination is adjusted by the mixer element 26 to provide a peak somewhat less than the desired total signal delivered to the output circuit 32–8.

The unlimited or expanded high-level leg 16 of the circuit, with its associated equalizer 28, provides normally a boost or increase in the mid-range or high frequency portions of the translated signal. This latter signal when properly carried through the branch mixer element 26 to the other half or portion of the signal at the terminal 25 and the output circuit 32, may provide the proper dynamics and equalization for the loud level portion of the total signal. The ratio between the low-level or limited portion and the high-level or unlimited portion of the signal for correct balance and desired dynamic range is provided through the mixing network 26–31.

The signal transforming circuits in each channel thus provide both frequency compensation and dynamic compensation as required to reproduce an originally-loud, accurately-balanced, sound from the source 5 with the same accurate balance at a lower volume level or intensity through the sound reproducing means 33. There is thus provided an intensity (db) transformer means or system to correctly proportion loudness variations at a lower intensity level of reproduction of sound to equal its original loudness variations at higher intensity level. Thus the high intensity level of the sound from an orchestra, or the like, may be transformed from an original high-intensity sound signal in the signal transformer circuits to provide a corrected or equalized sound signal that will give the same impression on a listener of frequency and dynamic range as the original sound, when reproduced at a different or lower intensity level.

The split or divided channel system of the present invention, and as represented by the signal transforming circuit shown, provides means for accomplishing the above objectives as described, whereby audio-frequency signals derived directly or reproduced from original generally-high intensity sound may be transformed to provide corresponding signals for recording and/or reproduction at low intensity levels with effectively equal loudness. As has been seen, the split or divided signal channel for producing the necessary functions includes means for compressing low-level signals in one channel branch 15 so that the intensity of the incoming sound, as represented by the signal amplitude, may be compressed or limited and at the same time altered in frequency such as to provide essentially a bass boost, and that as the sound intensity is increased, that is, as the signal amplitude representative thereof is increased, less and less compression is applied, to the point where expansion of the higher frequency signal components may occur in the unlimited high-level channel 16. Thus splitting or dividing the applied signal, processing or transforming and then remixing to provide an undivided output again in the signal channel, has been found to be both a simplified and effective way in which to achieve good sound reproduction at an intensity level lower than the original sound with improved sound quality over that heretofore available.

Consideration of the curves shown in the graphs of FIGURES 2, 3 and 4 will be of assistance in further understanding the operation of the circuit of FIGURE 1. Referring particularly to FIGURES 2 and 3, the curve M in FIGURE 2 shows the relation between loudness, in loudness units from 1 to 100,000, and loudness level or intensity from zero to 100 db or phons, at a reference frequency of 1000 c.p.s. A similar curve is shown on page 827 of the reference RCA Radiotron Designers Handbook. From this curve and the Fletcher-Munson contours of equal loudness level, as shown on page 828 of the same reference, are derived the modified contours or curves of equal loudness level, A to L, as shown in FIGURE 3.

Assuming the contour A to represent 100% loudness according to Fletcher-Munson curves or 100,000 loudness units as shown in the curve of FIGURE 2, a set of successive half-loudness curves or contours may be drawn with respect thereto interpolated between the established contours and spaced along the 1000 cycle ordinate in accordance with half-loudness intensity changes in db. These changes in db are indicated by readings derived from the curve M of FIGURE 2, as indicated by the dotted-line coordinates for the drop in db from 100 as required for attaining a first half-loudness step from 100,000 to 50,000 units. Similarly, from 50,000 to 25,000 units, from 25,000 to 12,500 units, and so on, these half-loudness steps are derived in db for any required lower level, and are plotted along an ordinate from 1000 cycles on the frequency scale vertically in FIGURE 3. The plot points 66 to 77 for the curves or contours A to L respectively, are found to be substantially 8 db apart between points 66–67, 67–68, and 72–73, 10 db apart between points 68–69, 69–70 and 71–72, and 12 db apart between points 70 and 71.

These spacings thus indicate the drop in db in each step to provide half-loudness. Between the remaining plot points 73 to 77, along the 1000 cycle axis, the drop required for the successive half-loudness steps is 7, 6, 4 and 3 db, respectively. Thus the loudness along the curve B is half the loudness represented by the curve A. The loudness along the curve C is half the loudness represented by the curve B, and so forth, through to the curve L, as indicated by the legend under "Loudness" and on the graph of FIGURE 3.

From this new set of equal loudness curves it will be seen that the amplitude or intensity level in db of sound to impart a given sensation of loudness on the hearing requires a wider range of change above 500 cycles then below, and that a bass boost or amplitude control is required below 500 cycles except for very high sound levels as represented by the contours A–D for example.

For this reason, as shown in FIGURE 4, to which reference is now made along with the preceding FIGURES 2 and 3, typical curves showing the relation between compensation (equalization) and mixing ratio in steps of 5 db input intensity, and as applied to the signal transforming circuits of FIGURE 1, are shown for the two legs or branches of either of the divided channels (A) or (B), and for mixed channel output response. These are designated in the legend as the curves A1 to A5 for the unlimited or high-level response, that is, the response in the branch or leg 16 of the right (B) channel, or in the branch or leg 44 of the left (A) channel. The curves B1 to B5 show the compressed and limited response corresponding to the curves A1 to A5, respectively, in the limited legs or branches 15 or 43 and show the equalized bass boost below 500 cycles as referred to.

For the mixed channel output response from the branch circuits, the curves C1 to C5, shown in dash lines in the graph of FIGURE 4, are derived from the corresponding A and B curves. These are effectively added to provide the corresponding respective dash-line curves in the group C. In this manner the corresponding curves in each group are added to provide the dash-line curves C successively from the lowest to the highest curve. It will be noted that an effective bass boost is provided in the final output at each of the 5 db separate intensity levels of the applied signal and that these curves are substantially parallel. In this system the same signal passes through both branches or legs of the signal translating channel, and in one the signal component is squeezed or limited and provided with effective bass boost, whereas in the other branch the signal component is boosted in midrange or treble and unlimited. The result is the desirably compensated response curves for the signal output in each channel as represented by the curves C1 to C5 in the graph of FIGURE 4. This mode of operation provides both frequency and dynamic compensation to reproduce an original sound at a lower level.

The derivation of the desired signal output curves of the type shown may be described as follows with further reference to FIGURE 3 along with FIGURE 4. Assuming that a relatively high intensity original sound, correctly balanced and with sufficient dynamic range to cover the amplitude range indicated between the curves A and G for example, and further assuming that the maximum loudness level desired for reproduction is no longer along the level indicated by the curve A but somewhat reduced, for example to that indicated by the curve D. As can be seen, the frequency response of the original curve A must be altered in such a manner as to lie or conform with that represented by the curve D. The curve B, which corresponds to a drop of half loudness from the original level A of the sound source, must now be altered to appear with the characteristic indicated by the curve E, that is, half the loudness of the new maximum amplitude or level indicated by the curve D. As can further be seen, the actual intensity required to produce this half loudness change between the curve A and the curve B is approximately 8 db, whereas the necessary change to accomplish half loudness, at the curve E, with respect to the curve D is approximately 10 db, thus showing that an expansion of the signal at 1000 cycles is needed as well as the necessary frequency compensation to conform the curve B to the curve E.

This procedure is followed with respect to these and other curves of FIGURE 3 to determine the correction for any particular signal level. For example, the dynamic difference between the curves E and F of the original sound source must be compressed in the present example, from approximately 12 db to approximately 7 db along the 1000 cycle line for the new desired maximum loudness. In other words it takes only 8 db change or drop, at 100% loudness level, to produce a lower of half loudness, whereas at the maximum loudness level represented by the curve E, it takes approximately a 12 db drop, to the curve F, to produce the same sensation of half loudness. Thus for this lower maximum amplitude level of operation the 8 db control range at 1000 cycles per curve A must be expanded to 12 db at 1000 cycles per the curve $F_1$ this being the function of the expanders 29 and 59 in the respective channel branches.

Comparing the curves A and D above referred to it will be seen that the curve D requires more bass compensation and likewise comparing the curves B and $E_1$ the curve E requires further bass compensation increasing at curve $E_1$ and thus successively the lower half-loudness curves require increasing bass compensation. On the other hand, the amplitude or intensity level required to produce half loudness decreases below the curve $G_1$ for example, providing a half-loudness change of approximately 8 db at 1000 cycles between the curve G and H, a difference of approximately 7 db at 1000 cycles between the curves H and I, and so forth, thus indicating that compression is required at the lower levels.

In any case, the divided and limited portion of the signal and the divided and unlimited portion of the signal are mixed together in a ratio to give the desired dynamic range for the same sensation of loudness at the different or lower signal reproduction level. Compensation in the two branches is added to shape the respective response characteristics for the desired combined output characteristic. Those represented by the graphs of FIGURE 4 indicate one possible branch and channel response for obtaining this result. Flexibility of compensation and mixing ratio is provided by this divided channel system. By this system an original loud intensity sound may be transformed to give the same impression as the original sound when auditioned at a lower intensity.

What is claimed is:

1. A dynamic equalizer and compensating system for sound signal translation from a higher amplitude or intensity level of production to a lower amplitude or intensity level of reproduction, comprising in combination, signal translating channel means including a divided signal transforming circuit having a limited low-level branch and an unlimited high-level branch, said branches having a common input circuit and a common output circuit, signal mixing means interposed between each branch and the common output circuit, gain control means in one of said branches for controlling the relative signal amplitude in said branches, low-level signal utilization means connected with said output circuit, high-level signal supply means connected with the input circuit, limiter and bass-response equalizer means connected in the limited branch of said circuit for equalizing and dynamically controlling signal translation therethrough and shaping the composite signal output response through said mixer means in the output circuit, and high-frequency equalizer and expander means in the unlimited branch of said circuit for equalizing and dynamically controlling the signal translation therethrough and further shaping the composite signal output response through said mixer means in the output circuit.

2. In a multi-channel audio-frequency signal translating system, a signal transforming circuit in at least one channel for altering the dynamics and equalization of translated signals originating from sound at one intensity level for reproduction at a lower intensity level with improved fidelity, said circuit comprising a low-level and a high-level branch connected for dividing and modifying an applied channel signal, the low-level branch of said channel-circuit including signal-amplitude limiter means followed by low-frequency signal equalizer means providing effective dynamic response to signal amplitude variations and output signal modification, the high-level branch of said channel circuit providing unlimited signal translation and including high-frequency signal equalizer means followed by expander means whereby compensation and equalization is provided in the two branches, means for mixing the limited and unlimited signals from said branches to provide a composite output signal in accordance with predetermined contours of equal loudness level for reproduction at said lower intensity level, common output circuit means for said signal transforming circuit connected with said branch signal mixing means, low-level channel signal utilization means connected with said common output circuit means, and means for applying high-level signals for said channel to said signal translating system.

3. In a dual-channel stereophonic signal translating system, a signal transforming circuit in each channel for altering the dynamics and equalization of translated signals originating from stereophonic channel sound at higher intensity levels for reproduction at lower intensity levels with improved fidelity, said circuits each comprising low-level and high-level branches connected for dividing an applied channel signal, the low-level branch of each channel circuit including signal limiter and equalizer means providing effective dynamic response to signal amplitude variations and output signal modification, the high-level branch of each channel circuit providing unlimited signal translation and including equalizer and expander means for high-frequency compensation and equalization, means for mixing the limited and unlimited signals from said branches to provide a composite output signal in accordance with predetermined contours of equal loudness level for reproduction from each channel at said lower intensity levels, common output circuit means for said signal transforming circuits connected with said branch signal mixing means in each channel, channel signal utilization means connected with said common output circuit means, and means for applying high-level stereophonically-related signals for said channel to said signal translating system.

4. In an audio frequency signal translating system for translating original high level audio frequency signals in a manner that the dynamic loudness characteristics thereof are maintained when said original signals are reproduced at lower levels, the combination comprising, a signal input circuit for receiving an original high level audio frequency signal, and a signal output circuit for delivering a modified version of said original audio frequency signals which may be reproduced at lower levels than said original signals yet with substantially the same dynamic loudness characteristic, and means providing frequency equalization interconnected between said input and output circuits having a signal level responsive amplitude-vs.-frequency relationship such that the maximum level of the original signals is translated to said output circuit as resultant signals which may be reproduced at a lower maximum level with substantially the same subjective loudness-vs.-frequency relationship as said original signals and such that other levels of said original signals are translated to said output circuit to produce resultant signals which may be reproduced at a subjective loudness-vs.-frequency relationship bearing the same subjective proportional loudness relationship to the lower maximum level as said other levels of the original signals bear to the maximum level of original signals.

5. In an audio frequency signal translating system for translating original high level audio frequency signals in a manner that the dynamic loudness characteristics thereof are maintained when said original signals are reproduced at lower levels, the combination comprising, a signal input circuit for receiving an original high level audio frequency signal, and a signal output circuit for delivering a modified version of said original audio frequency signals which may be reproduced at lower levels than said original signals yet with substantially the same dynamic loudness characteristic, and means interconnected between said input and output circuits for compressing relatively low frequency components and for expanding mid-frequency range components of said audio frequency signals applied to said input circuit.

6. In an audio frequency signal translating system for translating original high level audio frequency signals in a manner that the dynamic loudness characteristics thereof are maintained when said original signals are reproduced at lower levels, the combination comprising, a signal input circuit for receiving a high level audio frequency signal linearly related to said original signal, and a signal output circuit for delivering a modified version of said original audio frequency signals, and frequency equalization means connected between said input and output circuits having an amplitude-vs.-frequency characteristic which translates to said output circuit resultant signals in response to a given level of said high level signals which when reproduced at a lower level than said given level produces substantially the same subjective frequency-vs.-loudness characteristic as said high level signals at said given level, said frequency equalization means being operable to compress relatively low frequency components and to expand mid-frequency range components of audio frequency signals applied to said input circuit so that the dynamic loudness characteristics of the high level signals are maintained at lower levels of reproduction.

7. An audio frequency signal translating system for translating original high level audio frequency signals in a manner that the dynamic loudness characteristics thereof are maintained when said original signals are reproduced at lower levels, comprising the combination of, a signal input circuit for receiving original high level audio frequency signals, and a signal output circuit for developing a modified version of said original audio frequency signals which may be reproduced at lower levels than said original signals with substantially the same subjective volume dynamics as said original signal, frequency responsive equalization means interconnected between said input and output circuits for providing control of the low frequency and mid-frequency range components and adjusted to provide substantially less attenuation for said low frequency components than for said mid-frequency range components for low levels of audio signals applied to said input circuit, and means coupled to said frequency responsive equalization means for effectively compressing the volume range of said relatively low frequency components, and for expanding the volume range of said mid-frequency range components.

References Cited by the Examiner

UNITED STATES PATENTS

| | | | |
|---|---|---|---|
| 1,844,422 | 2/1932 | Mathes et al. | 333—14 |
| 1,993,859 | 3/1935 | Roberts | 333—28 |
| 2,137,032 | 11/1938 | Snow | 179—1 |
| 2,343,471 | 3/1944 | Nixon | 179—1 |
| 2,395,159 | 2/1946 | Albin | 179—100.1 |
| 2,808,466 | 10/1957 | Olson et al. | 179—100.1 |
| 3,013,125 | 12/1961 | Goldmark et al. | 179—100.4 |

ROBERT H. ROSE, *Primary Examiner.*